United States Patent
Yoon et al.

(10) Patent No.: US 7,139,124 B2
(45) Date of Patent: Nov. 21, 2006

(54) WIDE VIEWING ANGLE SCREEN AND PROJECTION TELEVISION COMPRISING THE SAME

(75) Inventors: Seok-Il Yoon, Dacion Metropolitan (KR); Gyu-hwan Hwang, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 55 days.

(21) Appl. No.: 10/772,417

(22) Filed: Feb. 6, 2004

(65) Prior Publication Data

US 2004/0223217 A1 Nov. 11, 2004

(30) Foreign Application Priority Data

Feb. 6, 2003 (KR) .................. 10-2003-0007442

(51) Int. Cl.
*G03B 21/60* (2006.01)
*G02B 27/10* (2006.01)

(52) U.S. Cl. ........................... 359/456; 359/623
(58) Field of Classification Search ........ 359/455–457, 359/621–622, 624–625
See application file for complete search history.

(56) References Cited

U.S. PATENT DOCUMENTS 2,618,198 A * 11/1952 Luboshez .................. 359/456
4,923,280 A * 5/1990 Clausen et al. ............. 359/456
5,066,099 A * 11/1991 Yoshida et al. ............. 359/457
RE33,795 E * 1/1992 Ogino ........................ 359/457
5,513,036 A * 4/1996 Watanabe et al. ........... 359/457
5,615,045 A * 3/1997 Takuma et al. ............. 359/456
6,124,969 A * 9/2000 Funazaki et al. ........... 359/456
6,822,792 B1 * 11/2004 Goto .......................... 359/456
6,862,139 B1 * 3/2005 Chang et al. ............... 359/457
2005/0117212 A1 * 6/2005 Kumagai et al. ........... 359/457

FOREIGN PATENT DOCUMENTS

| JP | 2000-338607 A | 12/2000 |
|----|---------------|---------|
| KR | 96-015507 | 11/1996 |
| KR | 1999-0072845 | 9/1999 |
| KR | 2000-0015228 A | 3/2000 |

* cited by examiner

*Primary Examiner*—Christopher Mahoney
(74) *Attorney, Agent, or Firm*—Sughrue Mion, PLLC (57) ABSTRACT

A screen having a wide viewing angle and a projection television including the screen are provided. The screen includes a Fresnel lens sheet for converting incident light into near-parallel light, a lenticular lens sheet including a horizontal array of vertical cylindrical lenses for horizontally emitting light, in which vertical black stripes are formed in parallel on connection portions for the cylindrical lenses, and a light diffusion film including a vertical array of horizontal cylindrical lenses for vertically emitting light, in which horizontal black stripes are formed in parallel on connection portions for the cylindrical lenses. In particular, the screen has a wide vertical viewing angle and a high contrast ratio, thereby providing a high definition image.

42 Claims, 6 Drawing Sheets

WIDE VIEWING ANGLE SCREEN AND PROJECTION TELEVISION COMPRISING THE SAME

BACKGROUND OF THE INVENTION

This application claims priority from Korean Patent Application No. 2003-7442, filed on Feb. 6, 2003, in the Korean Intellectual Property Office, the disclosure of which is incorporated herein by reference in its entirety.

1. Field of the Invention

Apparatuses and methods consistent with the present invention relate to a screen and a projection television comprising the screen. More particularly, the present invention relates to a screen having a wide viewing angle and a projection television comprising the screen.

2. Description of the Related Art

With increasing screen sizes of displays, studies about displays providing good image quality regardless of the positions of viewers, i.e., viewing angles have been done.

Figure 1:
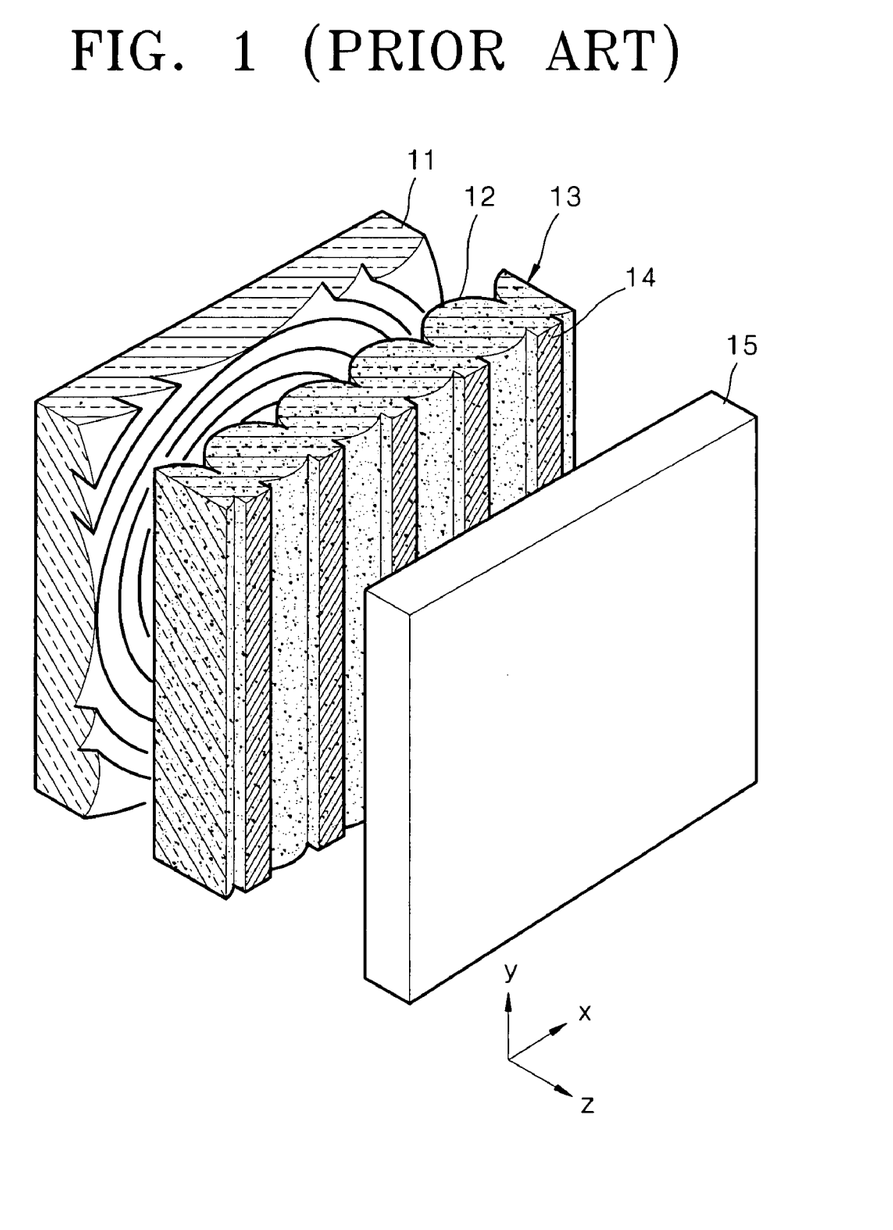
FIG. 1 is a schematic exploded perspective view of a conventional screen.

FIG. 1 is a schematic exploded perspective view of a conventional projection screen. Referring to FIG. 1, a conventional projection screen comprises a Fresnel lens sheet 11 converting light emitted from an image source into parallel light, a horizontal lenticular lens sheet 13 disposed on the front surface of the Fresnel lens sheet 11 and comprising vertical cylindrical lenses 12 arranged in a horizontal direction to emit light in a horizontal direction, and a protective filter 15 transmitting light output from the lenticular lens sheet 13 and protecting the lenticular lens sheet 13. Here, black stripes 14 are positioned on protrusions for connection of the cylindrical lenses 12, which are formed at an exit face of the horizontal lenticular lens sheet 13. The black stripes serve to absorb light output from the protrusions and to block external light, thereby increasing a contrast ratio.

A conventional projection screen can provide a wide horizontal viewing angle. However, a relatively narrow vertical viewing angle is provided.

Figure 2:
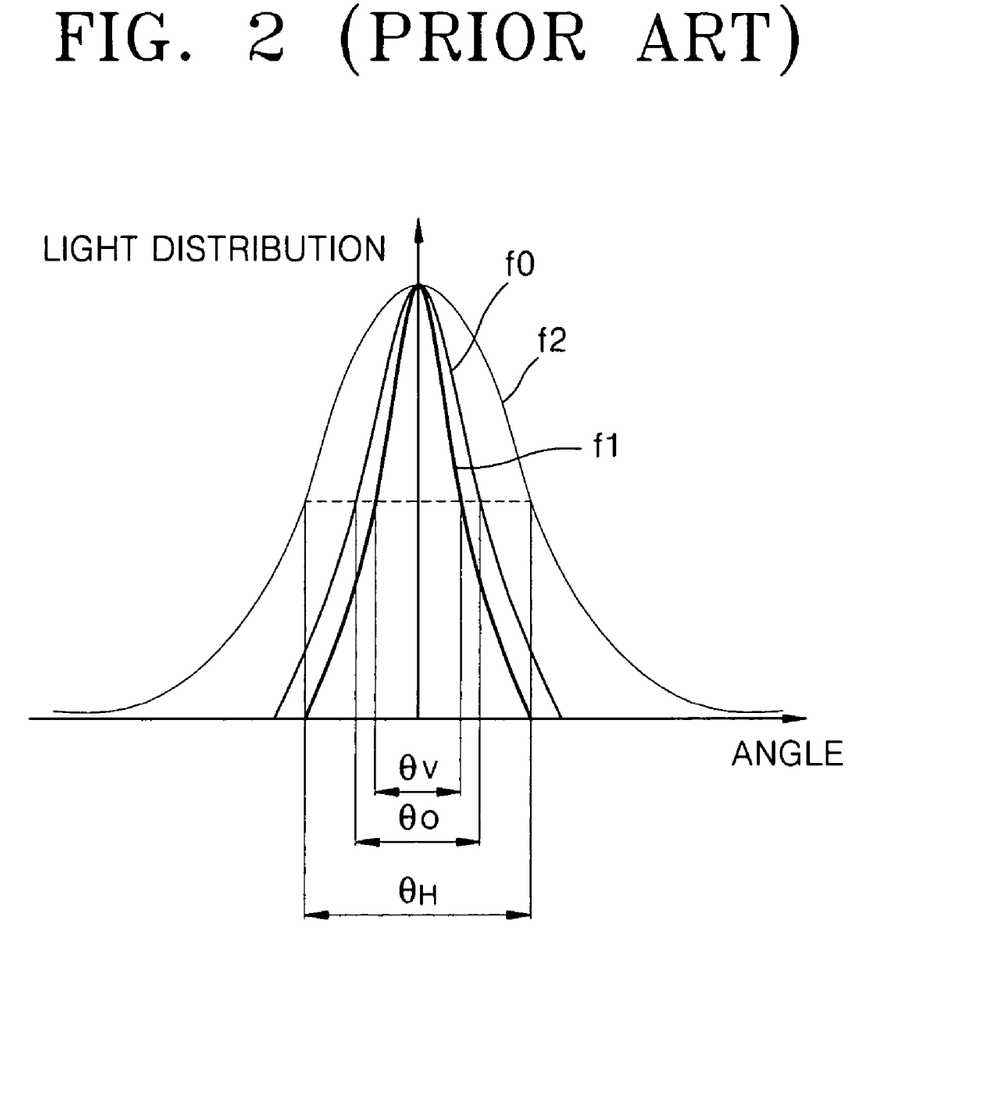
FIG. 2 is a graph showing light distribution according to a viewing angle in a conventional screen.

FIG. 2 is a graph showing the intensity of light finally output from the conventional projection screen shown in FIG. 1 according to a viewing angle of a viewer. Here, f0 represents light distribution according to a horizontal viewing angle in the absence of a lenticular lens sheet, f1 represents light distribution according to a vertical viewing angle in the presence of a lenticular lens sheet, and f2 represents light distribution according to a horizontal viewing angle in the presence of a lenticular lens sheet. Referring to FIG. 2, with respect to a viewing angle distribution having light intensity corresponding to a half of the maximal light intensity, f0 has a standard viewing angle distribution $\theta_O$, f2 has a wide horizontal viewing angle distribution $\theta_H$, and f1 has a narrow vertical viewing angle distribution $\theta_V$.

Conventionally, in order to increase a vertical viewing angle, a light-diffusing agent is incorporated into a lenticular lens sheet. Alternatively, a vertical lenticular lens sheet having a vertical array of horizontal cylindrical lenses can be further used, like in a rear projection screen disclosed in Korean Patent Laid-Open Publication No. 2000-15228.

However, since the light-diffusing agent is used in a large amount, using the light-diffusing agent increases diffusion of light, thereby increasing loss of light amount. On the other hand, using the vertical lenticular lens sheet can slightly increase a vertical viewing angle. However, while light passes through two lenticular lens sheets, loss of light increases due to reflection or diffusion, thereby lowering brightness and contrast ratio. In addition, conventionally, a vertical lenticular lens sheet is formed on a surface of a Fresnel lens sheet or is separately formed, thereby increasing burdens on processing.

SUMMARY OF THE INVENTION

The present invention provides a screen that can provide a wide vertical viewing angle and a high contrast ratio and a projection television comprising the screen.

According to an aspect of the present invention, there is provided a screen comprising: a first lens for converting incident light into near-parallel light; a second lens comprising a horizontal array of vertical cylindrical lenses for horizontally emitting light, in which vertical stripes absorbing visible light are formed in parallel on connection portions for the vertical cylindrical lenses; and a light diffusion film comprising a vertical array of horizontal cylindrical lenses for vertically emitting light, in which horizontal stripes absorbing visible light are formed in parallel on connection portions for the horizontal cylindrical lenses.

The second lens may contain a light-diffusing agent.

Each of the vertical cylindrical lenses of the light diffusion film may have a spherical or non-spherical entrance face and a flat exit face.

The light diffusion film may be a film with high light transmittance, for example, made of polyethylene terephthalate (PET) or polycarbonate (PC).

Each of the cylindrical lenses of the second lens may have a spherical or non-spherical face. Each of the vertical cylindrical lenses of the second lens may have a spherical or non-spherical entrance face and a spherical or non-spherical exit face, and the entrance face has a first curvature and the exit face has a second curvature, wherein the first curvature and the second curvature are different.

The screen may further comprise a protective filter disposed on a projection light path of the second lens to protect the screen. The protective filter may be coated with an anti-reflective material. The protective filter may be laminated on the light diffusion film.

According to another aspect of the present invention, there is provided a projection television comprising: an illuminating optical system for generating light; an image optical system for converting light output from the illuminating optical system into an image according to an applied image signal; a projection optical system for projecting the image; and a screen for displaying an image created by light projected from the projection optical system, the screen comprising: a Fresnel lens sheet for converting incident light into near-parallel light; a lenticular lens sheet comprising a horizontal array of vertical cylindrical lenses for horizontally emitting light, in which vertical black stripes are formed in parallel on connection portions for the vertical cylindrical lenses; and a light diffusion film comprising a vertical array of horizontal cylindrical lenses for vertically emitting light, in which horizontal black stripes are formed in parallel on connection portions for the horizontal cylindrical lenses.

The lenticular lens sheet may contain a light-diffusing agent.

Each of the horizontal cylindrical lenses of the light diffusion film may have a spherical or non-spherical entrance face and a flat exit face.

The light diffusion film may be a film with high light transmittance, for example, made of PET or PC.

Each of the vertical cylindrical lenses of the lenticular lens sheet may have a spherical or non-spherical face. Each of the vertical cylindrical lenses of the lenticular lens sheet may have a spherical or non-spherical entrance face and a spherical or non-spherical exit face, and the entrance face has a first curvature and the exit face has a second curvature, wherein the first curvature and the second curvature are different.

The screen may further comprise a protective filter disposed on a projection light path of the lenticular lens sheet to protect the screen. The protective filter may be coated with an anti-reflective material. The protective filter may be laminated on the light diffusion film.

According to the present invention, the light diffusion film comprises a vertical array of horizontal cylindrical lenses and horizontal black stripes formed on connection portions for the horizontal cylindrical lenses. The light diffusion film is disposed between the Fresnel lens sheet and the lenticular lens sheet or between the lenticular lens sheet and the protective filter. Therefore, a wide vertical viewing angle and a high contrast ratio can be ensured.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a screen and a projection television comprising the screen according to the present invention will be described in detail with reference to the accompanying drawings.

Figure 3:
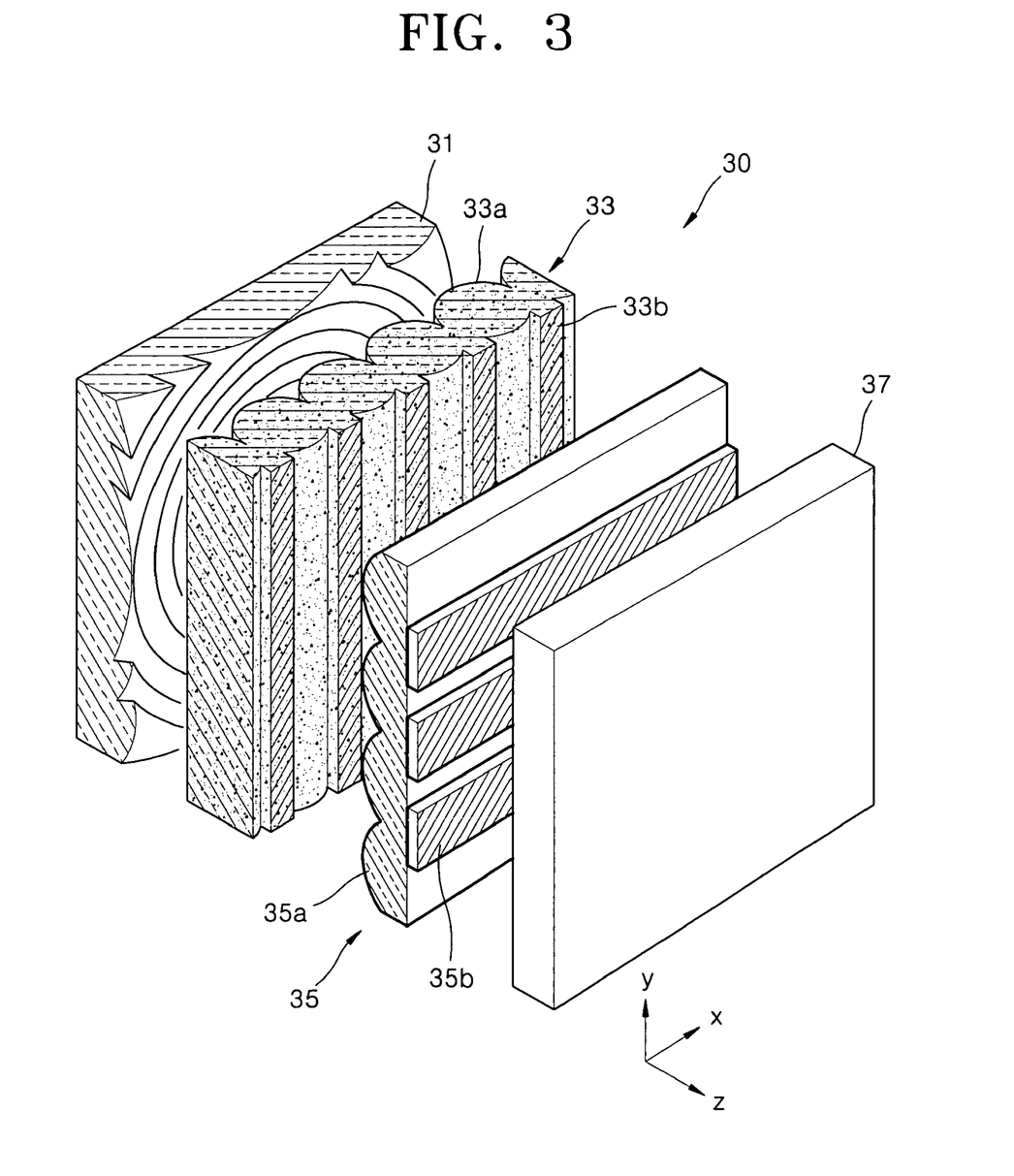
FIG. 3 is an exploded perspective view of a screen according to a first embodiment of the present invention.
Figure 4:
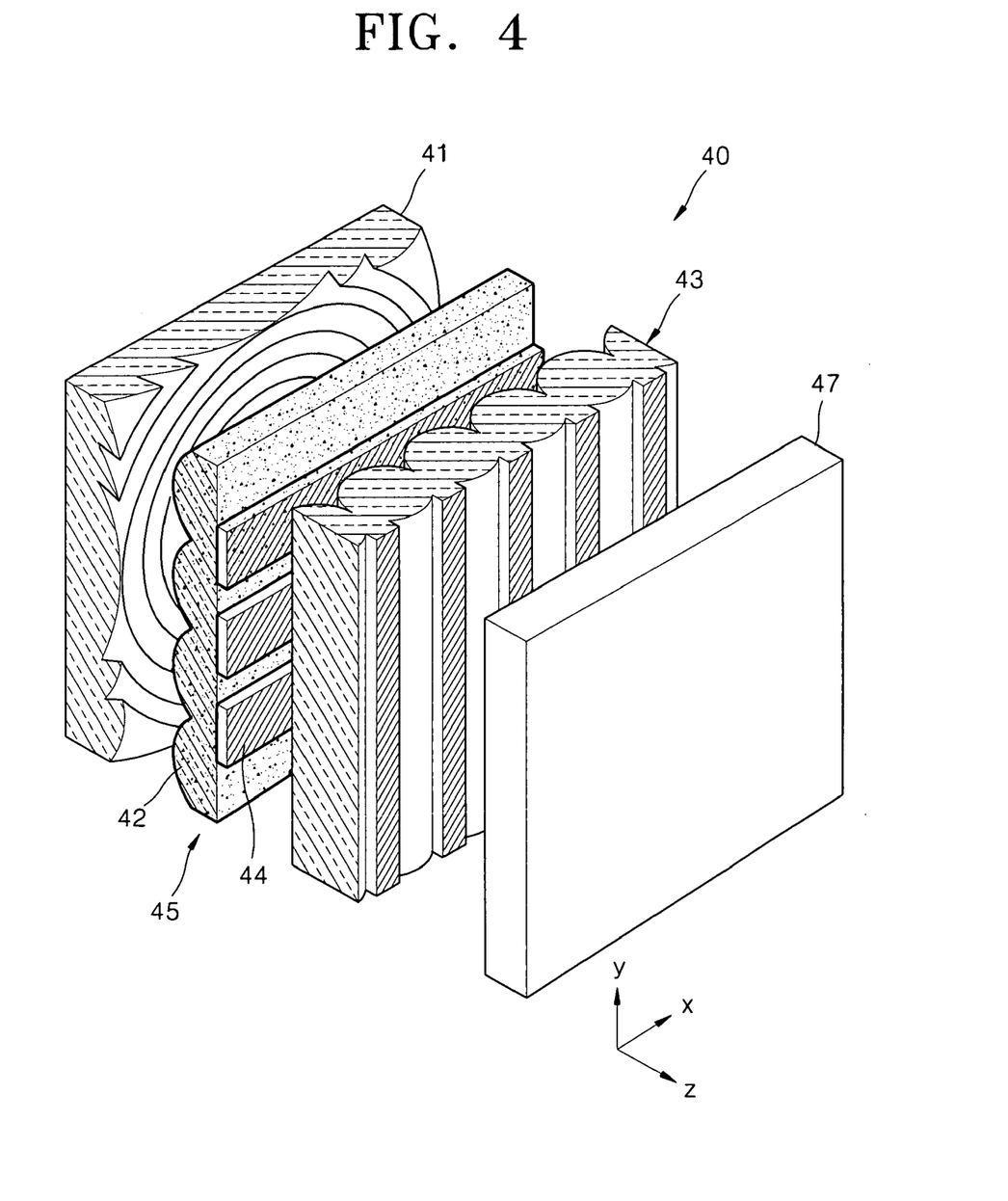
FIG. 4 is an exploded perspective view of a screen according to a second embodiment of the present invention.

FIGS. 3 and 4 are schematic exploded perspective views of screens according to first and second embodiments of the present invention, respectively.

Referring to FIG. 3, a screen according to the first embodiment of the present invention comprises a first lens for converting light emitted from an image source (not shown) into near-parallel light, a second lens for emitting light output from the first lens in left and right directions, i.e., in a horizontal direction, to widen a horizontal viewing angle, a light diffusion film 35 for emitting light output from the second lens top and bottom directions, i.e., in a vertical direction, to widen a vertical viewing angle, and a protective filter 37 disposed on a projection light path of the light diffusion film 35 to protect the entire surface of the screen. For example, the first lens is a Fresnel lens sheet 31 and the second lens sheet is a lenticular lens sheet 33.

In an exemplary embodiment, the Fresnel lens sheet 31 has Fresnel grooves formed by coating a UV curable resin on a polymethyl methacrylate (PMMA) substrate. The Fresnel grooves are formed at a predetermined pitch and create a multi-focus to control a viewing distance.

The lenticular lens sheet 33 is positioned on a projection light path of the Fresnel lens sheet 31. The lenticular lens sheet 33 comprises a horizontal (x-axis direction) array of a plurality of vertical (y-axis direction) cylindrical lenses 33a. Therefore, the lenticular lens sheet 33 horizontally emits near-parallel light output from the Fresnel lens sheet 31, thereby widening a horizontal viewing angle and reducing a color shift. Here, the curvatures of the entrance faces of the cylindrical lenses 33a may be different from those of the exit faces of the cylindrical lenses 33a.

The exit face of the lenticular lens sheet 33 comprises a horizontal array of protrusions connecting the cylindrical lenses 33a. Stripes are formed on the upper surfaces of the protrusions to block external light and to absorb some light output after being diffused from the lenticular lens sheet 33. For example, the stripes are black stripes 33b. Here, the black stripes 33b are formed at a predetermined ratio to the entire area of the lenticular lens sheet 33 to thereby adjust brightness and contrast appropriately. In an exemplary embodiment, the lenticular lens sheet 33 contains a light-diffusing agent to increase diffusion of light output from the Fresnel lens sheet 31.

The light diffusion film 35 is disposed on a projection light path of the lenticular lens sheet 33 to vertically emit light output from the lenticular lens sheet 33, thereby widening a vertical viewing angle. The light diffusion film 35 comprises a vertical array of hemicylindrical lenses 35a having spherical or non-spherical faces of a predetermined curvature on a base film. The hemicylindrical lenses 35a are arranged to be perpendicular to the array direction of the cylindrical lenses 33a constituting the lenticular lens sheet 33. The exit face of the light diffusion film 35 comprises black stripes 35b to prevent a contrast reduction. In an exemplary embodiment, the hemicylindrical lenses 35a of the light diffusion film 35 have a predetermined pitch so that Moire interference does not occur between the light diffusion film 35 and the Fresnel lens sheet 31.

The black stripes 35b can be formed by an ink printing method. In an exemplary embodiment, the black stripes 35b are formed by a photolithography process. That is, a high transmissive film such as polyethylene terephthalate (PET) film or a polycarbonate (PC) film is formed on the exit face of the light diffusion film 35 and a photoresist is then deposited on the transmissive film. When horizontal light enters into the entrance face of the light diffusion film 35, the light is refracted by the hemicylindrical lenses 35a. As a result, some areas of the photoresist are exposed to the light. When the exposed areas are removed using a developing solution, the transmissive film remains only on unexposed areas, as shown in FIG. 3. When ink is absorbed in the transmissive film-containing areas, the black stripes are formed. The areas and positions of the black stripes 35b can vary depending on the characteristics of the Fresnel lens sheet 31 and the lenticular lens sheet 33. The photolithography process makes it possible to easily adjust the areas of the black stripes 35b according to desired optical characteristics.

In an exemplary embodiment, a screen according to the first embodiment of the present invention further comprises the protective filter 37 adjacent to the light diffusion film 35 for protecting an external surface of the screen. For this, the protective filter 37 may be coated with an antistatic material and a material for preventing the formation of an external scratch. Further, the protective filter 37 may be coated with an antireflective material several times, or alternatively, with an anti-glare material to induce a diffuse reflection.

For the sake of simplifying a screen fabrication process, the protective filter 37 may be laminated on the light diffusion film 35. The lamination process can be carried out using an adhesive, but is not limited thereto. The lamination process can provide strengths enough to prevent the bending and deformation of the light diffusion film 35 and can prevent the formation of micro-folds at the light diffusion film 35, thereby enhancing image quality.

FIG. 4 is a schematic exploded perspective view of a screen according to the second embodiment of the present invention. Unlike in FIG. 3, a light diffusion film 45 is disposed between a Fresnel lens sheet 41 and a lenticular lens sheet 43.

The structures and functions of the Fresnel lens sheet 41, the light diffusion film 45, the lenticular lens sheet 43, and a protective film 47 are as described above for the corresponding components of FIG. 3. The light diffusion film 45 may contain a light-diffusing agent to increase the diffusion and emission of light output from the light diffusion film 45.

The structures of the light diffusion film 45 and the lenticular lens sheet 43 are not limited to those as mentioned above. It must be noted that the shapes of the light diffusion film 45 and the lenticular lens sheet 43 may be changed with each other. The light diffusion film 45 may be formed only on some areas of the lenticular lens sheet 43. Black stripes may be formed in various shapes such as circular or polygonal shapes.

Figure 5A:
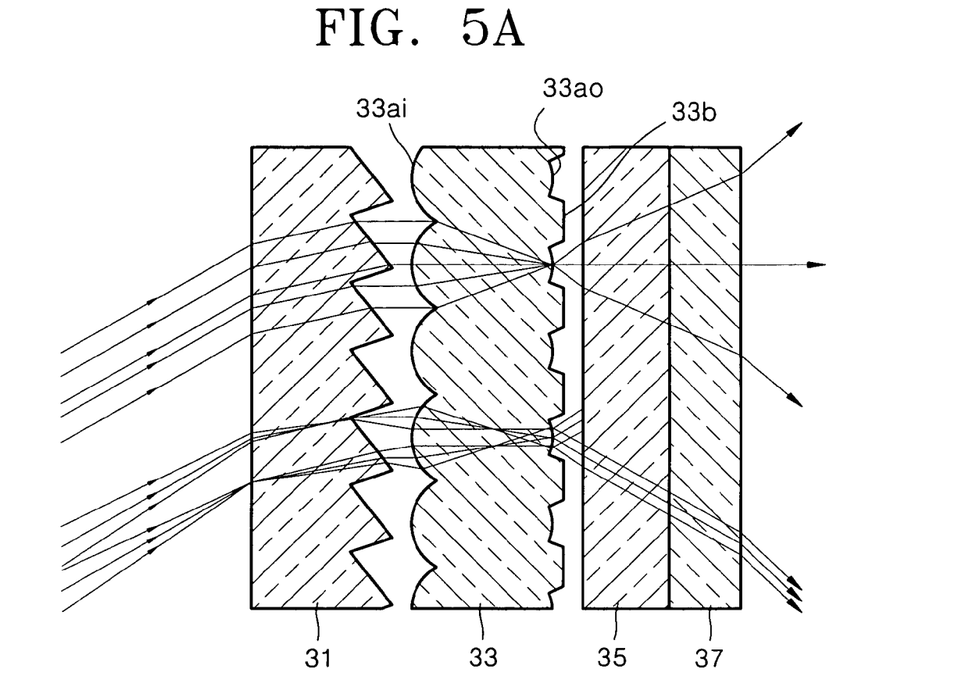
FIG. 5A is a plan view of the screen of FIG. 3.
Figure 5B:
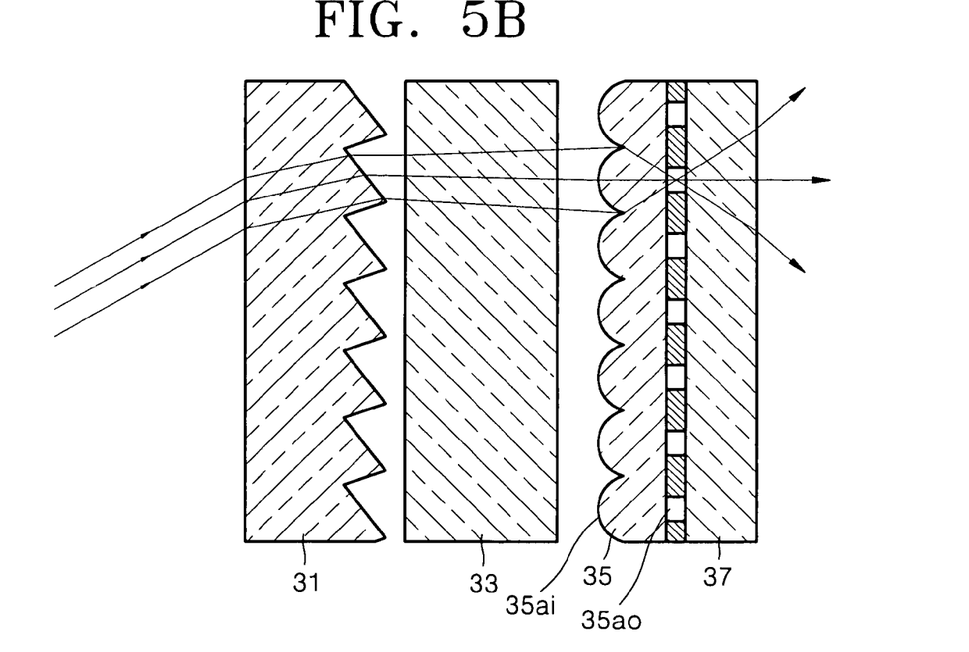
FIG. 5B is a side view of the screen of FIG. 3.

FIGS. 5A and 5B are, respectively, schematic plan and side views of the screen according to the first embodiment of the present invention as shown in FIG. 3.

Referring to FIG. 5A, light emitted from the Fresnel lens sheet 31 is reflected and converted into near-parallel light. Incident light of the lenticular lens sheet 33 is reflected at the entrance faces 33ai of the cylindrical lenses and then emitted in a horizontal direction from the exit faces 33ao of the cylindrical lenses. When viewed from a top of the screen, it appears that light goes straight continuously without being reflected through the light diffusion film 35 and the protective filter 37 until it reaches a viewer.

Referring to FIG. 5B, when viewed from a side of the screen, light passing through the lenticular lens sheet 33 appears to go straight. Light output from the Fresnel lens sheet 31 is inputted into the light diffusion film 35 via the lenticular lens sheet 33. Light is reflected at the entrance faces 35ai of the cylindrical lenses of the light diffusion film 35. Light output from the exit faces 35ao of the cylindrical lenses of the light diffusion film 35 is emitted in a vertical direction and then passes through the protective filter 37 without being reflected, as shown in FIG. 5B.

Figure 6:
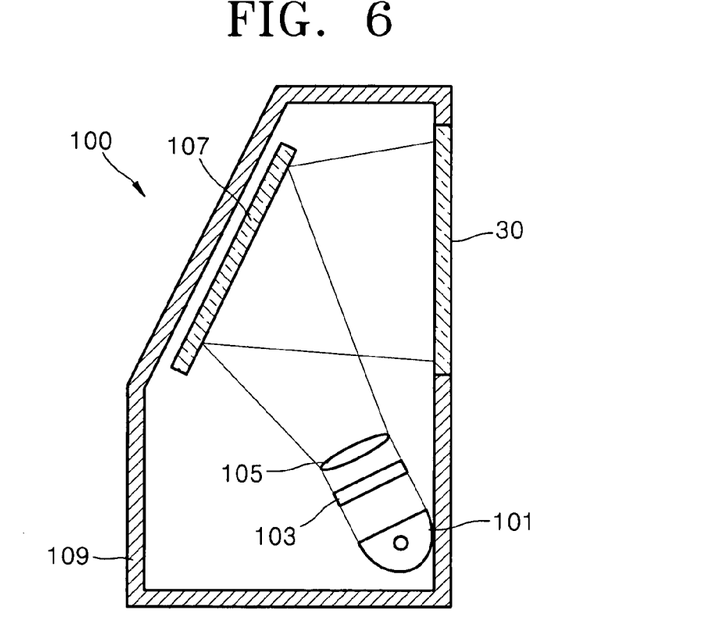
FIG. 6 is a schematic structural view of a projection television according to an embodiment of the present invention.

FIG. 6 is a schematic structural view of a projection television according to an embodiment of the present invention.

Referring to FIG. 6, a projection television 100 according to an embodiment of the present invention comprises a screen 30 disposed at the front surface of a housing 109, an illuminating optical system 101 disposed in the housing 109 and having a light source, an image optical system 103 for modulating light output from the illuminating optical system 101 according to an image signal, a projection optical system 105 for magnifying light output from the image optical system 103 to be projected onto the screen 30, and a mirror 107 for reflecting light output from the projection optical system 105 to be projected onto the screen 30. The mirror 107 can change a light path, thereby decreasing the size of the projection television.

One of the screens according to the first and second embodiments of the present invention as shown in FIGS. 3 and 4 is used as the screen 30 of the projection television 100 according to an embodiment of the present invention.

Figure 7:
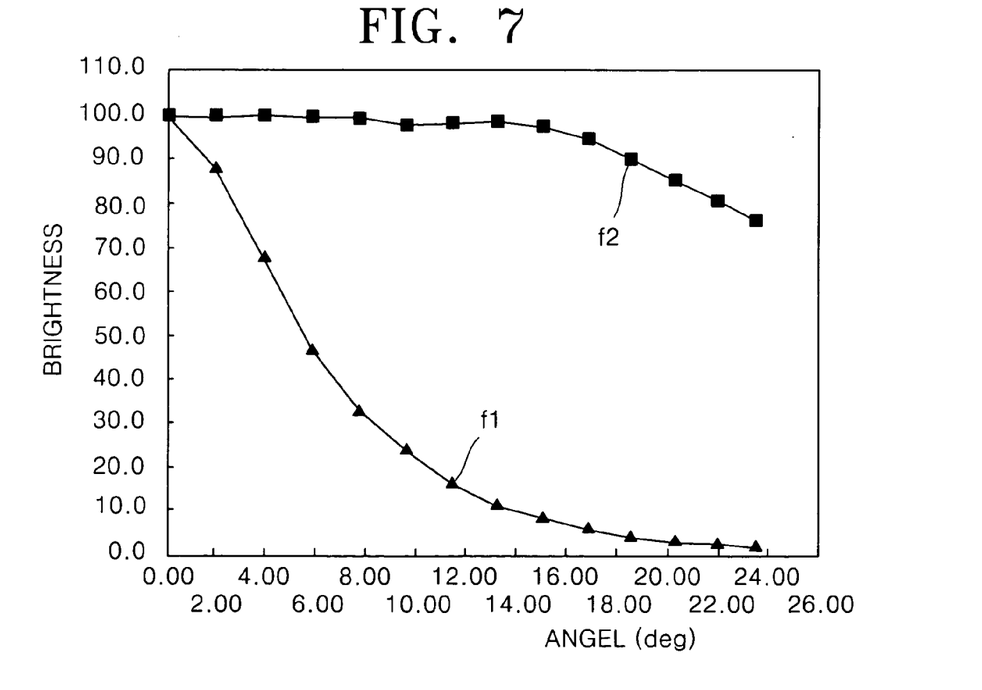
FIG. 7 is a graph showing brightness with respect to a vertical viewing angle according to an embodiment of the present invention.

FIG. 7 is a graph showing brightness distribution with respect to a vertical viewing angle in a conventional projection television f1 that has a common screen and in a projection television f2 that has the screen according to the first embodiment of the present invention. Here, in the projection television according to the present invention, a monochromatic cathode ray tube (CRT) is used as an image source. A Fresnel lens sheet comprises red, green, and blue light lenses formed by UV curing on a PMMA substrate and having a pitch of 0.068 mm. A lenticular lens sheet comprises black stripes formed by extrusion of PMMA and having a pitch of 0.52 mm. The black stripes occupy 45% of the entire area of the lenticular lens sheet. A light diffusion film comprises an array of cylindrical lenses having a pitch of 0.155 mm on a PET base film. Black stripes of the light diffusion film occupy 60% of the entire area of the light diffusion film. A protective film is coated with an anti-glare material.

Referring to FIG. 7, in graph f1, as a vertical viewing angle increases, brightness greatly decreases. In particular, at more than 6 degrees, brightness is rapidly reduced to less than 50% (cd/m$^2$). On the other hand, in graph f2, brightness distribution remains constant independent of vertical viewing angles. That is, it can be seen that a projection television comprising a screen according to the present invention provides uniform light diffusion distribution at a wide viewing angle.

As is apparent from the above description, a screen according to the present invention provides wide vertical and horizontal viewing angles and a high contrast ratio, thereby producing a high performance, high definition projection television.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A screen comprising:
    a first lens for converting incident light into near-parallel light;
    a second lens comprising a horizontal array of vertical cylindrical lenses for horizontally emitting light, in which vertical stripes absorbing visible light are formed in parallel on connection portions for the vertical cylindrical lenses; and
    a light diffusion film comprising a vertical array of horizontal cylindrical lenses for vertically emitting light, in which horizontal stripes absorbing visible light are formed in parallel on connection portions for the horizontal cylindrical lenses, wherein each of the horizontal cylindrical lenses of the light diffusion film comprises a flat exit face.

2. The screen according to claim 1, wherein each of the horizontal cylindrical lenses of the light diffusion film comprises a spherical entrance face.

3. The screen according to claim 1, wherein each of the horizontal cylindrical lenses of the light diffusion film comprises a non-spherical entrance face of which cross section at a vertical plane is not a circle or a partial circle.

4. The screen according to claim 1, wherein the light diffusion film is made of polyethylene terephthalate (PET) or polycarbonate (PC).

5. The screen according to claim 1, wherein each of the vertical cylindrical lenses of the second lens comprises a spherical face.

6. The screen according to claim 1, wherein each of the vertical cylindrical lenses of the second lens comprises a non-spherical face of which cross section at a horizontal plane is not a circle or a partial circle.

7. The screen according to claim 1, wherein each of the vertical cylindrical lenses of the second lens comprises a spherical entrance face comprising a first curvature and a spherical exit face comprising a second curvature, wherein the first curvature and the second curvature are different.

8. The screen according to claim 1, wherein each of the vertical cylindrical lenses of the second lens comprises a spherical entrance face comprising a first curvature and a non-spherical exit face comprising a second curvature, wherein the first curvature and the second curvature are different, and a cross section at a horizontal plane is not a circle or a partial circle.

9. The screen according to claim 1, wherein each of the vertical cylindrical lenses of the second lens comprises a non-spherical entrance face comprising a first curvature and a spherical exit face comprising a second curvature, wherein the first curvature and the second curvature are different, and a cross section at a horizontal plane is not a circle or a partial circle.

10. The screen according to claim 1, wherein each of the vertical cylindrical lenses of the second lens comprises a non-spherical entrance face comprising a first curvature and a non-spherical exit face comprising a second curvature, wherein the first curvature and the second curvature are different, and a cross section at a horizontal plane is not a circle or a partial circle.

11. The screen according to claim 1, wherein the second lens comprises a light-diffusing agent.

12. The screen according to claim 1, further comprising a protective filter disposed on a projection light path of the second lens to protect the screen.

13. The screen according to claim 12, wherein the protective filter is coated with an anti-reflective material.

14. The screen according to claim 12, wherein the protective filter is laminated on the light diffusion film.

15. The screen according to claim 1, wherein the light diffusion film is disposed between the first lens and the second lens.

16. The screen according to claim 1, wherein the second lens is disposed between the first lens and the light diffusion film.

17. The screen according to claim 1, wherein the first lens comprises a Fresnel lens sheet and the second lens comprises a lenticular lens sheet.

18. The screen according to claim 1, wherein the vertical stripes and the horizontal stripes are black stripes.

19. The screen according to claim 1, wherein the one or more darkened areas are black.

20. The screen according to claim 1, wherein one of the shapes of the one or more darkened areas is a stripe.

21. The screen according to claim 1, wherein the light diffusion film is formed on an area of the second lens.

22. The screen according to claim 1, wherein the one or more darkened areas on the exit face of the light diffusion film are formed by a photolithography process, wherein
a transmissive film is formed on the exit face;
a photoresist is deposited on the transmissive film;
areas of the photoresist are exposed to light refracted by the exit face;
transmissive film on areas exposed to light is removed using a developing solution, and
ink is absorbed in areas that contain transmissive film.

23. A projection television comprising:
an illuminating optical system for generating light;
an image optical system for converting light output from the illuminating optical system into an image according to an applied image signal;
a projection optical system for projecting the image; and
a screen for displaying an image created by a light projected from the projection optical system, the screen comprising: a Fresnel lens sheet for converting incident light into near-parallel light; a lenticular lens sheet comprising a horizontal array of vertical cylindrical lenses for horizontally emitting light, in which vertical black stripes are formed in parallel on connection portions for the vertical cylindrical lenses; and
a light diffusion film comprising a vertical array of horizontal cylindrical lenses for vertically emitting light, in which horizontal black stripes are formed in parallel on connection portions for the horizontal cylindrical lenses, wherein each of the horizontal cylindrical lenses of the light diffusion film comprises a flat exit face.

24. The projection television according to claim 23, wherein each of the horizontal cylindrical lenses of the light diffusion film comprises a spherical entrance face.

25. The projection television according to claim 23, wherein each of the horizontal cylindrical lenses of the light diffusion film comprises a non-spherical entrance face of which cross section at a vertical plane is not a circle or a partial circle.

26. The projection television according to claim 23, wherein the light diffusion film is made of polyethylene terephthalate (PET) or polycarbonate (PC).

27. The projection television according to claim 23, wherein each of the vertical cylindrical lenses of the lenticular lens sheet comprises a spherical face.

28. The projection television according to claim 23, wherein each of the vertical cylindrical lenses of the lenticular lens sheet comprises a non-spherical face of which cross section at a horizontal plane is not a circle or a partial circle.

29. The projection television according to claim 23, wherein each of the vertical cylindrical lenses of the lenticular lens sheet comprises a spherical entrance face comprising a first curvature and a spherical exit face comprising a second curvature, wherein the first curvature and the second curvature are different.

30. The projection television according to claim 23, wherein each of the vertical cylindrical lenses of the lenticular lens sheet comprises a non-spherical entrance face comprising a first curvature and a spherical exit face comprising a second curvature, wherein the first curvature and the second curvature are different, and a cross section at a horizontal plane is not a circle or a partial circle.

31. The projection television according to claim 23, wherein each of the vertical cylindrical lenses of the lenticular lens sheet comprises a spherical entrance face comprising a first curvature and a non-spherical exit face comprising a second curvature, wherein the first curvature is different from the second curvature, and a cross section at a horizontal plane perpendicular to a height of the vertical cylindrical lenses of the exit face is not a circle or a partial circle.

32. The projection television according to claim 23, wherein each of the vertical cylindrical lenses of the lenticular lens sheet comprises a non-spherical entrance face comprising a first curvature and a non-spherical exit face comprising a second curvature, wherein the first curvature is different from the second curvature, and a cross section at a horizontal plane perpendicular to a height of the vertical cylindrical lenses of the exit face is not a circle or a partial circle.

33. The projection television according to claim 23, wherein the lenticular lens sheet comprises a light-diffusing agent.

34. The projection television according to claim 23, further comprising a protective filter disposed on a projection light path of the lenticular lens sheet to protect the screen.

35. The projection television according to claim 34, wherein the protective filter is coated with an anti-reflective material.

36. The projection television according to claim 35, wherein the protective filter is laminated on the light diffusion film.

37. The projection television according to claim 23, wherein the light diffusion film is disposed between the Fresnel lens sheet and the lenticular lens sheet.

38. The projection television according to claim 23, wherein the lenticular lens sheet is disposed between the Fresnel lens sheet and the light diffusion film.

39. The projection television according to claim 23, wherein the one or more darkened areas are black.

40. The projection television according to claim 23, wherein one of the shapes of the one or more darkened areas is a stripe.

41. The projection television according to claim 23, wherein the light diffusion film is formed on areas of the lenticular lens sheet.

42. The projection television according to claim 23, wherein the one or more darkened areas on the exit face of the light diffusion film are formed by a photolithography process, wherein a transmissive film is formed on the exit face;

a photoresist is deposited on the transmissive film;

areas of the photoresist are exposed to light refracted by the exit face;

transmissive film on areas exposed to light is removed using a developing solution, and ink is absorbed in areas that contain transmissive film.

* * * * *